Nov. 1, 1927.

J. KATZMAN 1,647,450

FRICTION CLUTCH DRIVING MECHANISM

Filed Feb. 1, 1926

Inventor
Jacob Katzman.
By his Attorney
A. A. de Bomeville

Patented Nov. 1, 1927.

1,647,450

UNITED STATES PATENT OFFICE.

JACOB KATZMAN, OF BROOKLYN, NEW YORK.

FRICTION-CLUTCH DRIVING MECHANISM.

Application filed February 1, 1926. Serial No. 85,236.

This invention relates to a friction clutch driving mechanism.

The object of the invention is the production of a friction clutch driving mechanism, in which the parts thereof form a complete unit, adapted to be easily connected to the housings of various electric motors. The second object of the invention is the production of a driving mechanism of very simple construction, with simple parts, that can be easily repaired or replaced. The third object of the invention is the production of a clutch driving mechanism, by means of which a sewing machine can be intermittently operated by means of an electric motor. The fourth object of the invention is to produce a driving mechanism, in which the lubricating means thereof is contained within the same, to avoid the spilling of the lubricating medium on the outside surfaces thereof.

Figure 1:
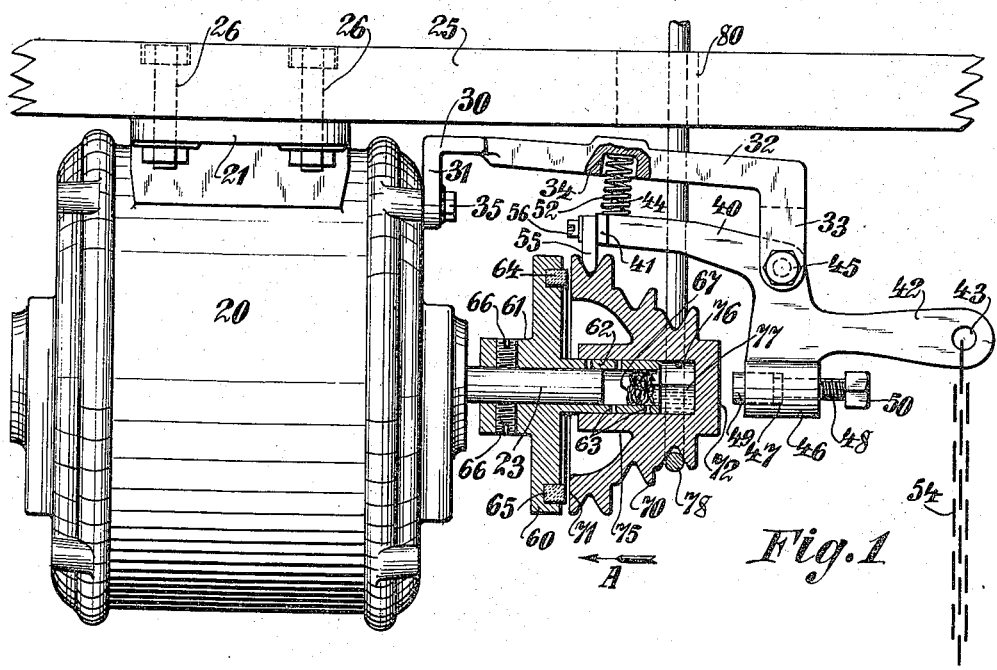
Figure 2:
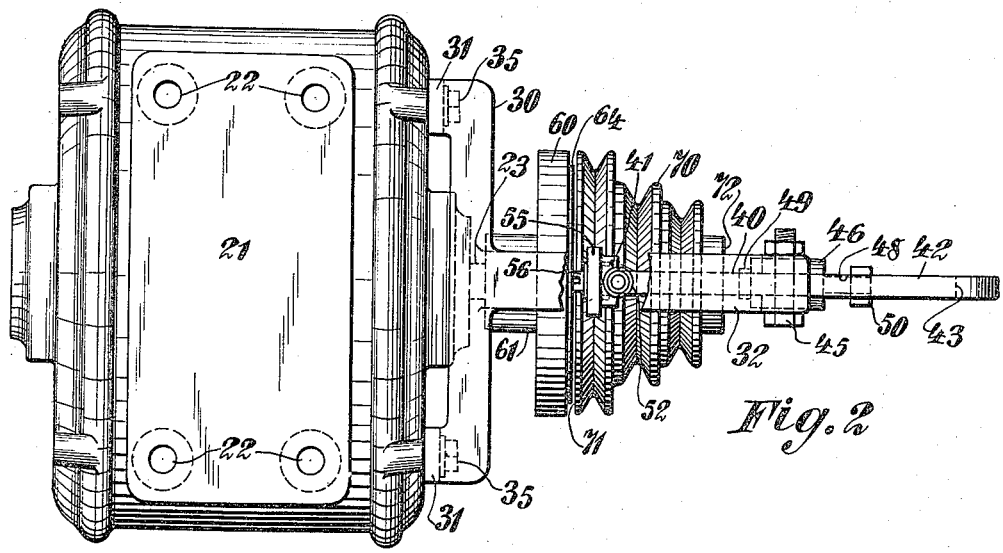

In the accompanying drawings Fig. 1 represents a side elevation partly in axial section of an exemplification of the friction clutch driving mechanism, with its electric motor and supporting table and Fig. 2 shows a partial to plan view of Fig. 1.

Referring to the drawings, an electric motor is indicated with the housing 20 having the supporting bracket 21 with the openings 22. The armature shaft of the motor is indicated at 23. A table is shown at 25, and bolts 26 connect the bracket 21 to said table.

A T shaped bracket comprises the cross member 30, with the depending feet 31, and the longitudinal member 32 with the depending bifurcated leg 33. A cavity 34 is formed in the longitudinal member 32. The feet 31 are fastened to the housing 20 by means of the screws 35. An operating lever is indicated with the supporting arm 40, having formed therewith the head 41, and the operating arm 42 with the opening 43. A pin 44 extends from the arm 40. The arm 40 is pivoted to the bifurcated leg 33 by means of the screw pivot 45. At one end and below the arm 42 is formed the threaded boss 46 with the cylindrical cavity 47. An adjusting screw 48 is in threaded engagement with the boss 46, and has at one end the adjusting plug 49, and at its other end the head 50. A helical spring 52 has one end supported on the pin 44 and its other end is seated in the cavity 34. A chain 54 has one end thereof extending through the opening 43 of the arm 42. A brake block 55 is detachably fastened to the head 41, by means of the screw 56.

A disc 60 has formed therewith on one side the hub 61, and on the other side the sleeve 62, having the openings 63. A friction ring 64, preferably of leather, is secured in an annular groove 65 formed in the disc 60. The disc 60 is supported on the armature shaft 23, by means of the screws 66. Fibrous packing 67, to absorb a lubricant is located within the sleeve 62.

A cone pulley 70 is indicated with the annular bearing face 71 at one side and the abutting head 72 at the other side thereof. The said pulley has formed therewith the sleeve 75 which constitutes an expansion of the cylindrical cavity 76, for a lubricant 77, formed in said pulley. A belt 78 for the cone pulley 70 extends through openings 80, in the table 25.

The elements of the friction clutch driving mechanism when not transmitting rotation to its cone pulley 70 from the electric motor, are positioned as indicated in the drawings. To transmit rotation to the said cone pulley and thereby to a sewing machine or other mechanism through the belt 78, the operator pulls the chain 54, by means of which the adjusting plug 49 is caused to bear against the abutting head 72. By this means the cone pulley 70 slides in the direction of the arrow A, and the annular bearing face 71 of said pulley is brought into frictional engagement with the adjoining face of the friction ring 64. By this means the rotation of the disc 60, which rotates with the armature shaft 23 of the electric motor, is transmitted to said cone pulley. While the operator pulls the chain 54, the supporting arm 40 of the operating lever swings up and releases the brake block 55 from its step of the cone pulley 70. When the chain 54 is released the helical spring 52 automatically swings down the arm 40 and thereby the brake block 55 contacts with its step of the cone pulley 70 and stops the rotation of the latter.

Having described my invention what I desire to secure by Letters Patent and claim is:

1. In a friction clutch driving mechanism the combination of a rotating disc having a sleeve extending from one side thereof, a cone pulley rotatively supported on the sleeve and adapted to frictionally engage said disc, an operating lever pivoted adjacent to said pulley, a brake block fastened to said lever on one side of its pivot, means to swing said lever on the other side of said pivot, said brake block adapted to engage one of the steps of the pulley, and a plug extending from said lever adapted to bear against said pulley to move it in the line of its longitudinal axis in one direction.

2. In a friction clutch driving mechanism the combination of a rotating disc having a sleeve extending from one side thereof, a cone pulley rotatively supported on the sleeve and adapted to frictionally engage said disc, a stationary bracket adjacent to said disc, said bracket having a cavity therein, an operating lever pivoted to said bracket, a brake block fastened to said lever on one side of its pivotal connection, a chain depending from the lever on the other side of its pivotal connection, said brake block adapted to engage one of the steps of the pulley, a plug extending from said lever adapted to bear against said pulley to move it in the line of its longitudinal axis in one direction and means interposed between said bracket and lever to move said pulley in an opposite direction.

3. The combination with a motor of a friction clutch driving mechanism, comprising a disc fastened to the armature shaft of the motor and having a sleeve extending from one side thereof, a friction ring secured to said disc, a pulley rotatively supported on the sleeve, said pulley having a bearing face at one end adapted to bear against said friction ring and having an abutting head at its other end, a bracket extending from the housing of said motor having a cavity therein and a depending bifurcated leg, an operating lever pivoted to said bracket, a brake block fastened to one end of said operating lever and a chain depending from its other end, said brake block adapted to engage one of the steps of the pulley, a plug adjustably connected to the operating lever and adapted to bear against the said abutting head of the pulley and a spring with one end seated in the cavity of the bracket and its other end bearing on said operating lever.

In testimony whereof I affix my signature.

JACOB KATZMAN.